March 17, 1931.  C. G. BUTLER  1,796,827
GREASE GUN COUPLING
Filed March 26, 1928
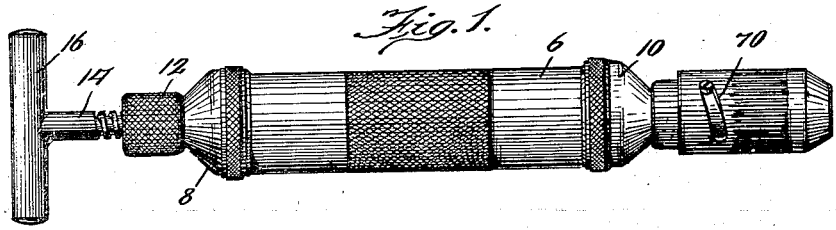
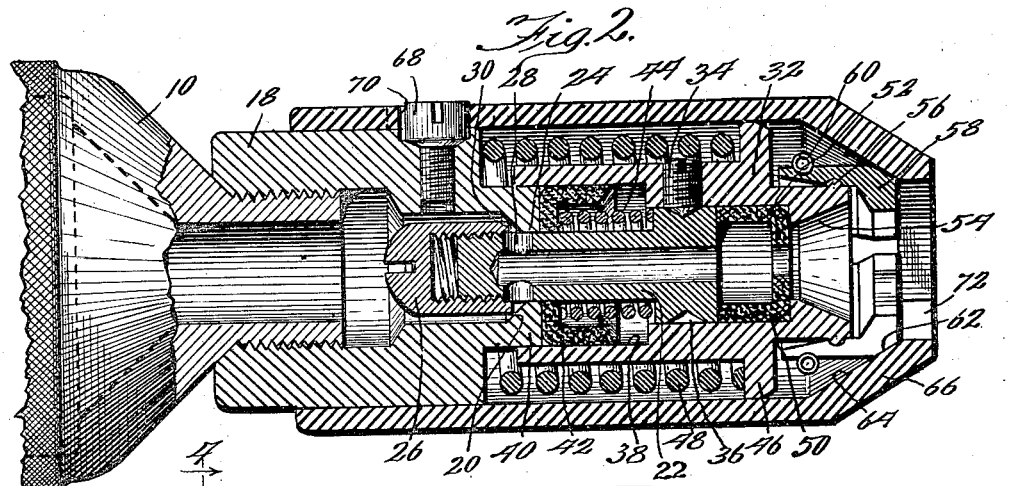
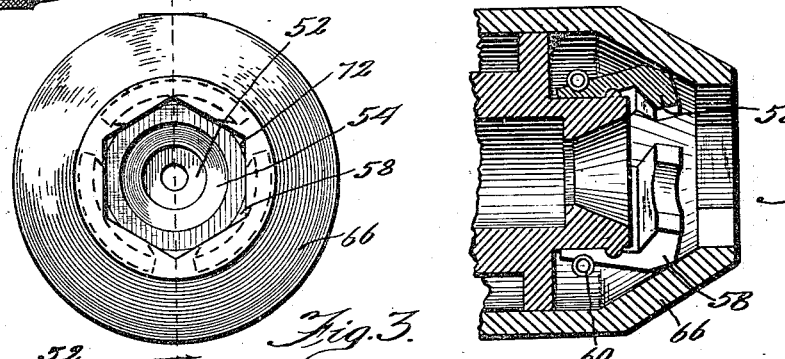 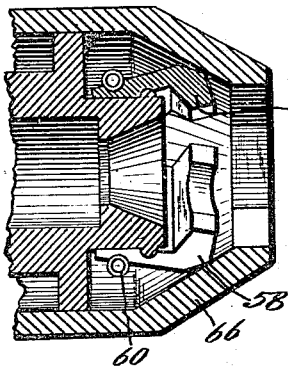
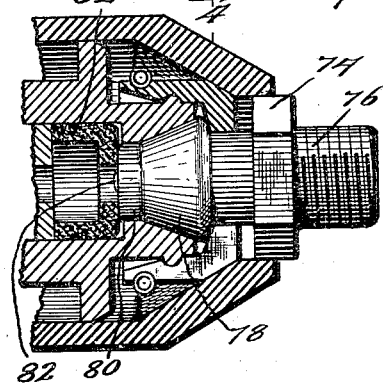
Inventor
Clyde G. Butler
By Wood & Wood
Attorneys Patented Mar. 17, 1931

1,796,827

UNITED STATES PATENT OFFICE

CLYDE G. BUTLER, OF CINCINNATI, OHIO, ASSIGNOR, BY MESNE ASSIGNMENTS, TO ALEMITE CORPORATION, OF CHICAGO, ILLINOIS, A CORPORATION OF DELAWARE

GREASE-GUN COUPLING

Application filed March 26, 1928. Serial No. 264,735.

My invention relates to lubricating apparatus and more particularly to valved couplings for grease guns by which a quick detachable connection may be made with a lubricant-receiving fitting.

It is an object of my invention to provide a coupling which is simple in construction, has relatively few operating parts and may be economically manufactured.

A further object is to provide an improved valved coupling in which the connection to the fitting is made before the valve is opened.

A further object is to provide an improved valve coupling in which a sleeve having a single cam slot is adapted to effect the coupling and valve opening operations.

Other objects will appear from the following description, reference being had to the accompanying drawings, in which Fig. 1 is a plan view of a lubricant compressor or grease gun incorporating my improved nozzle;

Fig. 2 is a vertical longitudinal section of the nozzle, showing the parts in the positions which they take after coupling with the fitting has been effected but prior to the opening of the valve;

Fig. 3 is an end elevation of the nozzle with the jaws in normal separated position;

Fig. 4 is a vertical section of the end portion of the nozzle taken on the line 4—4 of Fig. 3; and Fig. 5 is a transverse sectional view of the end portion of the nozzle showing the positions of the parts when connection with a fitting has been effected.

As best shown in Fig. 1, the compressor with which my improved nozzle is adapted to be used usually comprises a barrel 6 having end caps 8 and 10. The outer cap 8 has a knurled nut 12 threaded thereto which has internal threads along a portion of its length. These threads are adapted to cooperate with complementary threads formed upon a piston stem 14 which, at its inner end, carries the customary cup leather piston and at its outer end has a suitable handle 16.

The nozzle comprises a body 18 which is internally threaded so as to be screwed upon the end cap 10 and is axially bored and counterbored and has a conical valve seat 20 adjacent its outer end. A hollow valve stem 22 is reciprocable in and guided by the walls of an opening 24 formed in the end of the body 18. The valve stem has a valve head 26 threaded at its inner end and has a plurality of radial ports 28 leading from its central passage to a point directly beneath the contacting edge 30 of the valve head 26. The stem 22 is rigidly secured to an axially slidable coupling member 32 by a set screw 34, the point of which engages in an annular V-shaped groove 36 formed in the valve stem 22 for facility of assembly. The member 32 has a cylindrical bore 38. A reduced end portion 40 of the body 18 fits into the bore 38 and guides the member 32 for axial sliding movement.

A cup leather 42 engages the end surface of the projection 40 and the side walls of the bore 38 so as to prevent leakage of lubricant between the member 32 and the body 18. A spring 44 holds the cup leather in position. The member 32 has an outer projecting flange 46 which forms an abutment for one end of a spring 48, the other end of which abuts against body 18. The spring 48 is normally compressed and tends to slide the member 32 outwardly, outward movement thereof being limited by the abutment of valve 26 upon its seat 20. The member 32 has a cylindrical compartment 50 adjacent its outer end which forms a confining chamber for an apertured cup leather 52. The flange edge of the cup leather 52 normally rests against the outer end surface of the valve stem 22.

The outer end of the member 32 is of reduced diameter and has a conical recess 54 formed therein and on its external surface has an annular rib 56 which forms a fulcrum for a plurality of clamping jaws 58. A toroidal tension spring 60, fitting in suitable grooves formed in the clamping jaws 58, tends normally to hold the outer ends of the jaws 58 separated. The jaws 58 have conical surfaces 62 adjacent their outer ends which are engaged by a conical cam surface 64 formed upon the inside of a sleeve 66.

The sleeve 66 is axially slidable and rotatable with respect to the body 18, its movement, however, being limited by a fillister head cap screw 68 which is threaded in the body 18 and the head of which protrudes through an oblique cam slot 70 formed in the sleeve. The outer end of the sleeve 66 has a hexagonal opening 72 formed therein which, as shown in Fig. 5, is adapted to receive a hexagonal flange 74 formed upon a fitting 76, one end of which is threaded so as to be adapted to be screwed into a bearing, and the other end of which has an enlarged head 78 and a smaller cylindrical end portion 80. The fitting 76 has an axial bore, the outer end of which is closed by spring pressed ball check valve 82, as is well known in the art.

In operation, the parts are normally in the position shown in Figs. 1, 3 and 4. With the parts in this position, the handle 16 may be rotated so as to build up the desired pressure within the barrel 6 of the compressor. The nozzle is then applied to a fitting with the opening 72 in the sleeve 66 partially fitting over the flange 74 of the fitting. The compressor barrel is then rotated clockwise with respect to the fitting, thus causing the body 18 to be moved toward the fitting due to the interengagement of the screw 68 with is cam slot 70. This inward movement causes the jaws 58 to be forced inwardly with their claw projections behind the head 78 of the fitting, due to the camming action of the surface 64 of the sleeve 66.

During the first part of the rotation of the body with respect to the sleeve, the spring 48 is sufficiently strong to prevent axial movement of the body 18 with respect to the member 32. The end 80 of the fitting will thus be forced into sealing contact with cup leather 60 and slightly raise the plane surface of the cup leather from contact with the shouldered end surface of the compartment 50, as best shown in Fig. 5.

After the coupling operation has been completed, cont´ 1ued rotation of the body 18 with respect to the fitting 76 and hence, also, with respect to the sleeve 66, will cause continued inward movement of the body 18 and, since the member 32 is rigidly connected to the fitting by the jaws 58, the body 18 will move inwardly with respect to the valve 26 and all parts rigid therewith, and against the compression of the springs 44 and 48. As soon as the valve 26 and its seat 20 separate, the lubricant in the compressor will be forced with an explosive action past the valve 26 through the parts 28, the axial passage in the stem 22, and through the aperture in the cup leather 52 into the fitting 76.

If it is desired to force more lubricant than that which will be expelled due to the expansion of the air which is always more or less present in the lubricant, additional lubricant may be forced to the bearing by rotation of the handle 16. Such rotation will not tend to loosen the connection but instead will tend to maintain the connection tight and the valve open.

After sufficient lubricant has been forced into the bearing, the barrel of the compressor is rotated counterclockwise with respect to the fitting, thus permitting the body 18 to move outwardly with respect to the member 32 and permitting springs 44 and 48 again to force the valve 26 against its seat 22, and thereby to prevent further discharge or leakage of lubricant. Continued counterclockwise rotation of the compressor with respect to the fitting will cause the member 32 to be moved axially away from the fitting and permit the toroidal spring 60 to separate jaws 58 so that the coupling nozzle member may be removed from the fitting.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. A valved coupling for making a quick detachable connection with a lubricant-receiving fitting, comprising a body having an aperture therein, a valve normally closing said aperture, a spring for holding said valve in normal position, a member rigidly connected to said valve and carrying means for making a mechanical connection with a lubricant-receiving fitting, a sleeve rotatably and axially slidable with respect to said body, and a single pin and slot connection between said sleeve and said body for causing axial movement of said body with respect to said sleeve upon rotative movement between said body and sleeve, whereby said sleeve will operate said mechanical coupling means and subsequently open said valve.

2. In a device of the class described, the combination of an apertured nozzle body, a spring pressed valve normally closing said aperture, a member slidable with respect to said body, mechanical coupling means carried thereby, a sleeve surrounding said mechanical coupling means and having a camming surface for engagement therewith, a pin and cam slot forming the only connection between said sleeve and said body and a spring between said body and said member for preventing axial movement thereof before the completion of the mechanical coupling operation.

3. In a device of the class described, the combination of a lubricant compressor having an apertured nozzle body secured thereto, a spring pressed valve normally closing said aperture, a member slidable with respect to said body, a spring pressed cup leather for engaging said body and member, mechanical coupling means carried thereby, a sleeve surrounding said mechanical coupling means and having a camming surface for engagement therewith, a single pin and cam slot connection between said sleeve and said body, and resilient means acting between said body and said member to prevent axial movement thereof before the completion of the coupling operation.

4. A valved coupling for making a quick detachable connection with a lubricant receiving fitting comprising a body having an aperture therein, a valve for closing said aperture, a hollow stem secured to said valve and extending through said aperture, a valve spring engaging said stem for holding said valve in closed position, a member rigidly connected to said valve and carrying means for making a mechanical coupling with a lubricant-receiving fitting, a sleeve rotatable and axially slidable with respect to said body, a cam slot in said sleeve, and a pin operative in said slot and secured to said body, a spring positioned between said sleeve and said body normally holding the sleeve against rotation, said pin and slot being adapted to cause axial movement of said body relative to said sleeve upon rotative movement of said body against the pressure of said spring thereby to operate said mechanical coupling means and subsequently to open said valve.

5. In a device of the class described, in combination with a lubricant compressor, an apertured nozzle body, a spring pressed valve normally closing said aperture, a member slidable relative to said body and rigidly connected to said valve, mechanical coupling means carried by said member, a sleeve surrounding said mechanical coupling means and having a camming surface for engagement therewith, a pin and cam slot connection between said sleeve and said body, and a spring between said body and said member to prevent axial movement thereof before the completion of the mechanical coupling operation.

In witness whereof, I hereunto subscribe my name this 22nd day of March, 1928.

CLYDE G. BUTLER.